Dec. 7, 1971   J. D. McCALLION ET AL   3,625,060
INDICATOR SYSTEMS WITH POINTER AND COUNTER
Filed June 26, 1970   4 Sheets-Sheet 1

INVENTORS
JOHN D. McCALLION
HENRY J. CARLOMAGNO
BY
George H. Fritzinger
AGENT

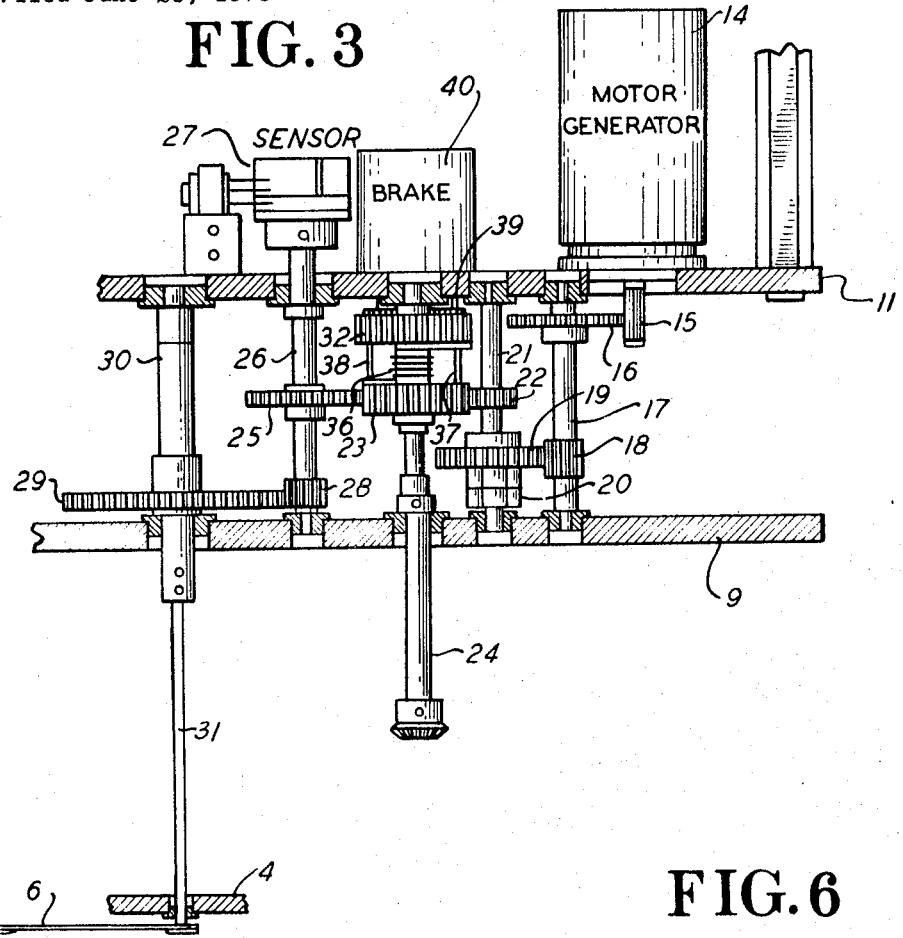
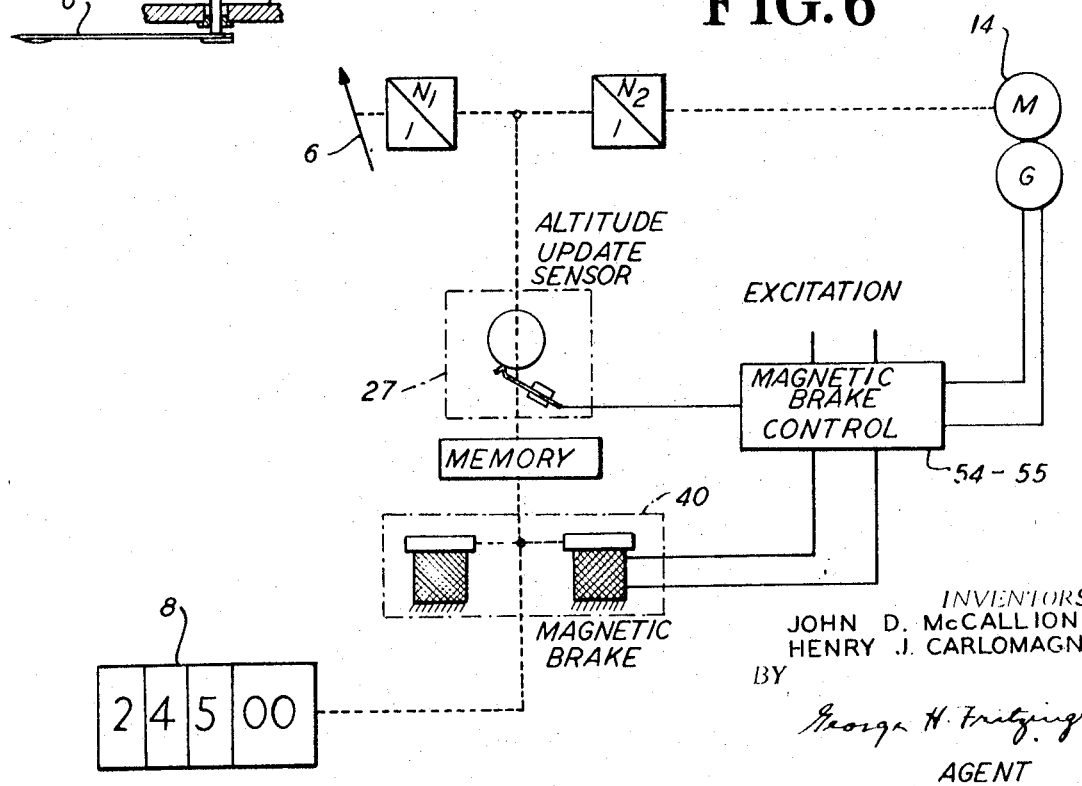

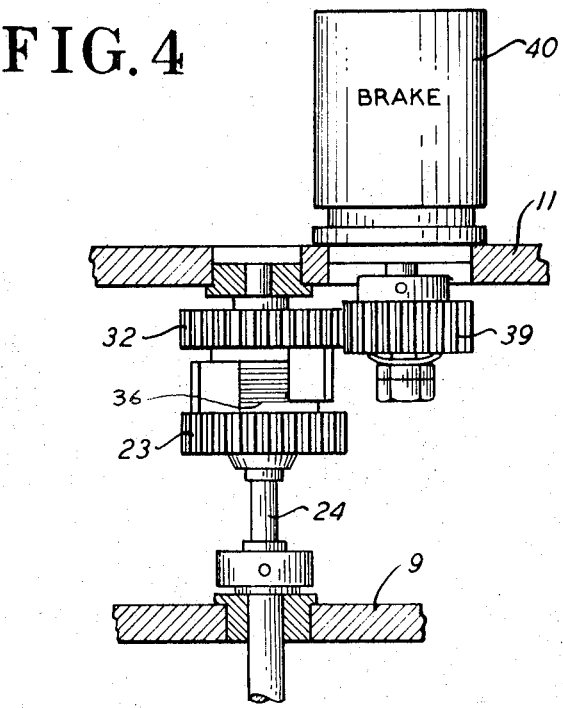
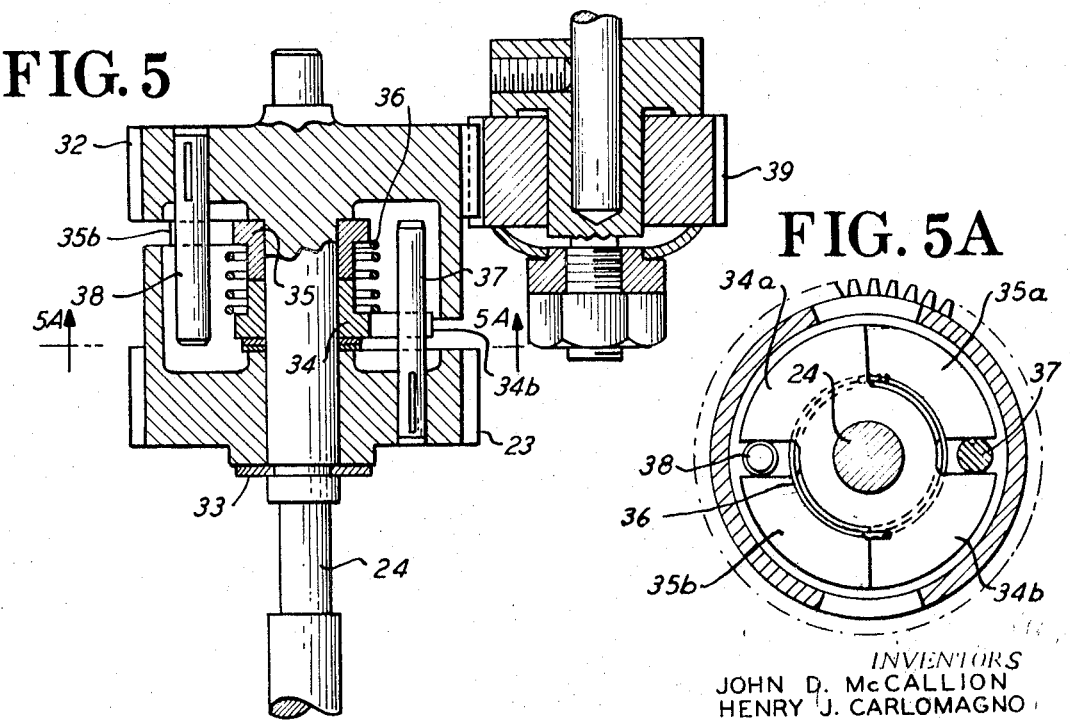

United States Patent Office 3,625,060
Patented Dec. 7, 1971

3,625,060
INDICATOR SYSTEMS WITH POINTER AND COUNTER
John D. McCallion, Pompano Beach, and Henry J. Carlomagno, Plantation, Fla., assignors to McGraw-Edison Company, Elgin, Ill.
Filed June 26, 1970, Ser. No. 50,021
Int. Cl. G01l 7/12
U.S. Cl. 73—384                    7 Claims

ABSTRACT OF THE DISCLOSURE

The altitude indicator has a counter for registering altitude in steps of twenty foot increments and a pointer progressively movable with change in altitude for measuring each increment. The invention includes a sensor movable in proportion tot he movement of the pointer to release a brake on the counter when the pointer goes through a predetermined incremental movement to cause the counter to be shifted in a backward or forward direction by one increment depending on whether the altitude is decreasing or increasing.

---

An object of the invention is to provide a novel indicator of the character mentioned which permits easy and accurate reading. More particularly, it is an object to provide an improved indicator having counter readout drums wherein the drums are always stopped in positions placing the numerals of the drums in the center of the viewing window.

Another object is to provide such improved indicating system wherein a counter drum is actuated in incremental steps from one reading position to the next relative to a viewing window and a pointer is moved progressively to indicate variations within each incremental step.

Another object is to provide such indicator comprising a pointer movable progressively through successive increments and a rapid updating counter calibrated by incremental divisions wherein the counter is normally braked and driven through a spring coupling and a sensor releases the brake to allow a step movement of the counter by one increment each time the pointer reaches the end of an increment.

Further objects and features of the invention will be apparent from the following description and the appended claims.

In a description of our invention reference is had to the accompanying drawings of which:

FIG. 3 is a side view of the mechanism of the instrument, showing the frame plates in section;

FIG. 4 is a side view of the magnetic brake and memory mechanism with frame parts shown in section;

FIG. 5 is a side view of only the magnetic brake and memory mechanism both shown in section and to enlarged scale;

FIG. 5A is a section on the line A—A of FIG. 5;

FIG. 6 is a diagrammatic view of the update drum mechanism for the counter; and

Figure 1:
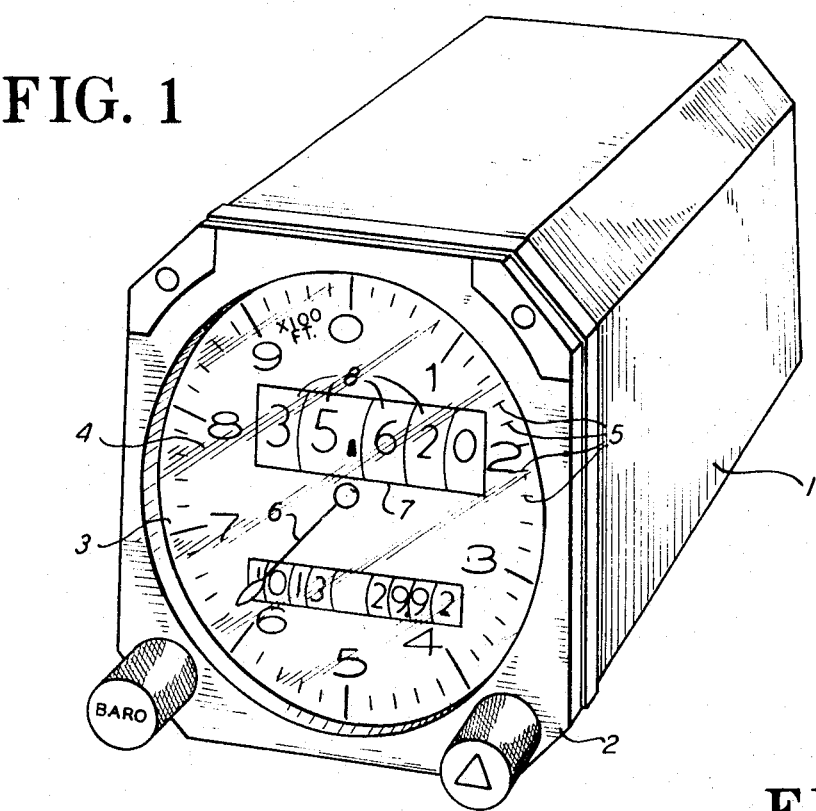
FIG. 1 is a front perspective view of an indicating instrument according to the invention.

The present instrument (see FIG. 1) is an altimeter housed in an oblong case 1 closed by a front panel 2. The panel 2 has a central opening 3 in which a dial 4 is set having a scale 5 calibrated as from 0 to 1000 feet (each graduation equals 20 feet) in one complete circle. A pointer 6 journaled at the center of the dial registers at its outer end with the scale 5. A rectangular window 7 in the upper half of the dial exposes a set of four counter drums 8 to read the altitude in feet through five digits. Another rectangular viewing window in the lower half of the dial may expose counter drums to read barometric pressure, time, etc., but is not a part of the present invention.

Figure 2:
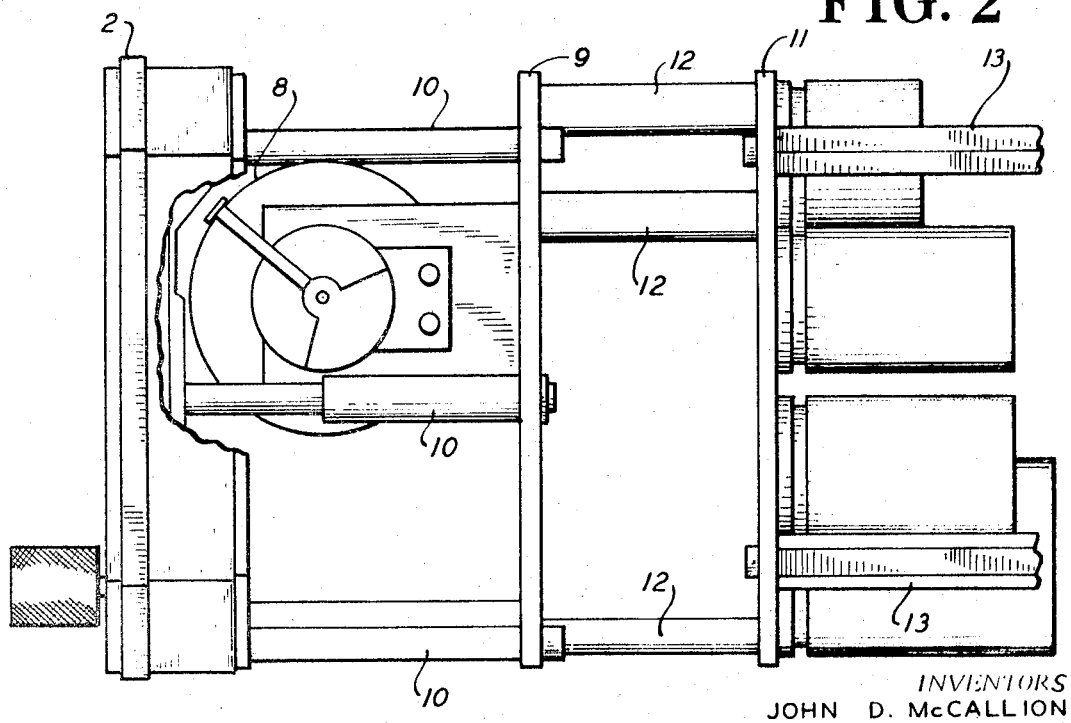
FIG. 2 is a partial side view of the internal structure of the above indicating instrument.

The frame of he instrument comprises a first frame plate 9 mounted in spaced parallel relation to the front panel 2 and held thereto by interconnecting posts 10 (FIG. 2), and a second frame plate 11 mounted in spaced parallel relation to the first frame plate via a series of interconnecting posts 12. There is also a series of posts 13 secured to the back side of the second wall 11 which are received by screws (not shown) to hold the case 1 to the frame structure.

The instrument is driven by a servo mechanism (see FIG. 3) comprising a motor generator set 14 so that any electrical circuit variation responsive to an altitude change will cause the motor generator set 14 to run and position the pointer and counter to indicate the new altitude. The motor M of the motor generator set 14 has a pinion gear 15 driving a gear 16 on a shaft 17 journaled in the frame plates 9 and 11. The shaft 17 has a pinion gear 18 driving a gear 19 connected by a slip clutch 20 to a shaft 21 journaled also in the frame plates 9 and 11. The step-down ratio of the gearing from the motor drive shaft to the shaft 21 is necessary to develop the required torque. The shaft 21 has a pinion gear 22 driving a gear 23 journaled on an enlarged diameter portion of shaft 24 itself journaled in the frame plates 9 and 11. The gear 23 is the input of a two-way spring coupling through which the counter mechanism is driven by the motor generator 14. The spring coupling is part of a memory device for advancing the counter by increments as is later described.

The gear 23 drives in a 1 to 1 ratio a gear 25 on a shaft 26 journaled in the frame plates 9 and 11. The shaft 26 is the drive shaft for a sensor 27 hereinafter described. The shaft 26 has a pinion 28 driving a gear 29 connected to a shaft 30 journaled also in the frame plates 9 and 11. The shaft 30 has an extension 31 leading centrally through the dial 4 which carries the pointer 6. The ratio of the gearing 28–29 in this application is 5 to 1. Thus, there is provided a continuous uninterrupted coupling from the motor M to the pointer 17 by step-down gear ratios.

The memory device shown in detail in FIGS. 4 and 5 comprises the input gear 23 above-described and a second gear 32 integral with the enlarged diameter portion of the shaft 35. The gear 23 is retained on the shaft portion at a spacing from the gear 32 by a retainer ring 33. On the shaft portion in the space between the gears 23 and 32 are two identical spring retainer collars 34 and 35 mounted end-to-end. Each collar has at its outer end a pair of diametrically-opposite sector-shaped arms designated by the number of the collar with suffix letters a and b. Surrounding the collars is a torsion spring 36 having the ends hooked on the arms of the respective collars to bias the collars in opposite directions relative to each other. Staked to the gears 23 and 32 are pins 37 and 38 which extend from each gear towards the other in parallel relation to the shaft 24. These pins are held yieldably in diametrically opposite positions respectively between an arm of one spring retaining collar and an arm of the other under a pressure of the torsion spring 36. Thus, the two gears are biased by the torsion spring 36 in opposite directions relative to each other into a centered position defined by the interposition of the pins 37 and 38 between the arms of the collars 34 and 35. This spring coupling allows the gear 23 to be advanced in either direction from its center position relative to the gear 32 as will appear.

Meshing with the gear 32 is a gear 39 of a magnetic brake 40 mounted on the frame plate 11. This brake is normally energized by the sensor 27 but the sensor releases the brake momentarily the instant the pointer 6 is moved a 20 foot increment on the scale 4. Thus, during an incremental change the pointer is moved progressively to indicate the change while the gear 32 is in a braked condition. During this movement of the pointer the torsion spring 36 is charged while the counter is held at standstill, but when the pointer has moved through 20 feet on the scale the brake is released allowing the torsion spring 36 to restore the gear 32 to its centered relationship with the gear 23. Since the movement of the gear 32 by the torsion spring is a definite one sufficient only to shift the counter mechanism through one increment of 20 feet the spring coupling may be aptly termed a memory device.

Figure 7:
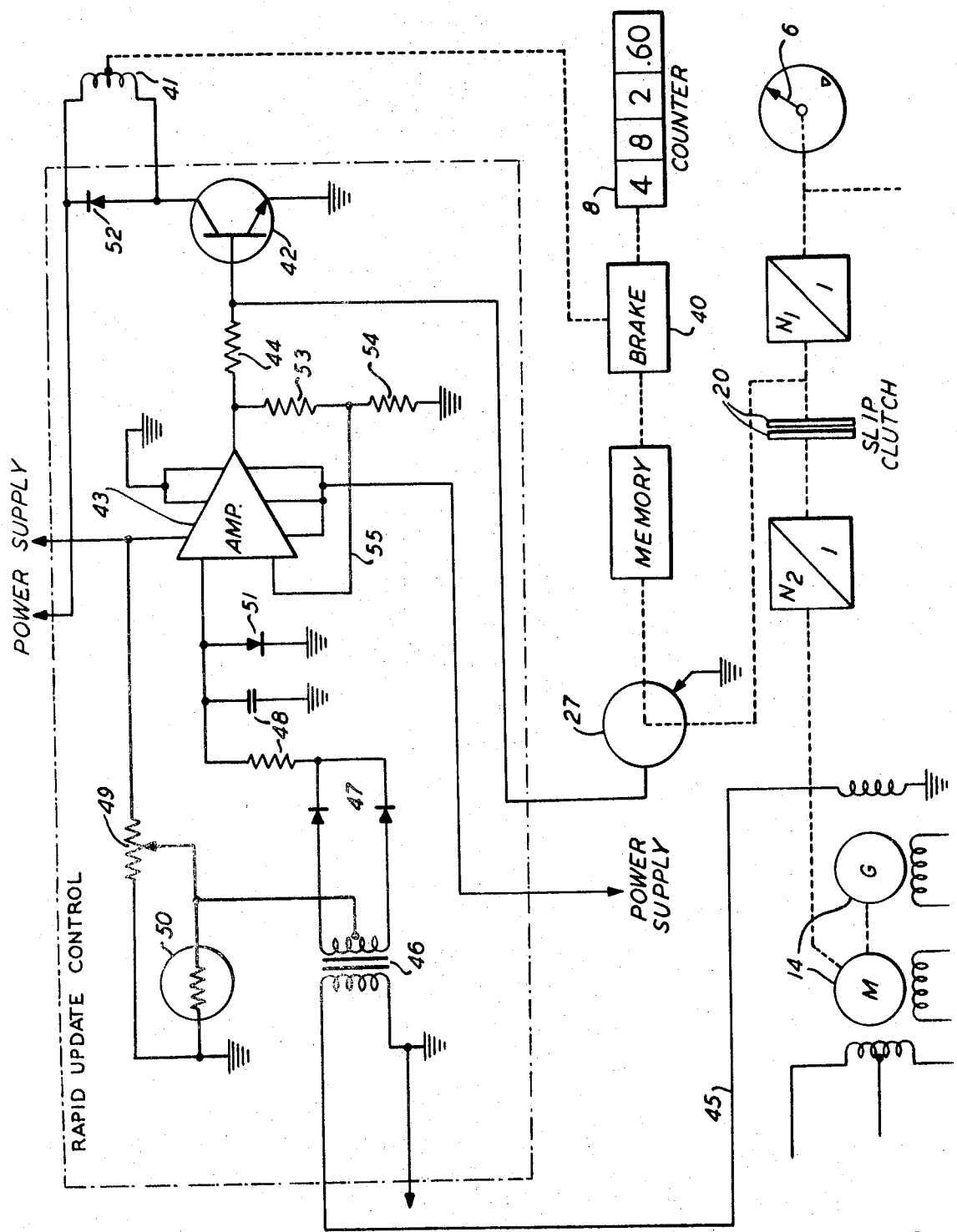
FIG. 7 is a schematic view of circuits and mechanism constituting the invention.

With reference to the schematic diagrams of FIGS. 6 and 7 a coil 41 of the brake 40 is connected to the output of a transistor 42. The sensor 27 is a switch device connected to the base of transistor 42 to ground the base when the sensor is moved through an equivalent of 20 feet. An amplifier 43 has its output connected to the base of transistor 42 via a current limiting resistor 44. The generator G of the motor generator set 14 of the servomechanism is connected by a lead wire 45 to the primary winding of isolation transformer 46. The secondary of this transformer is connected through a full wave rectifier 47 and an R.C. filter 48 to the input of the amplifier 43. The voltage output of this amplifier is a steady six volts during static and low speed servo operation. This normal output voltage is set by adjustment of a variable resistor 49 connected across the supply voltage of the amplifier and shunted by a temperature sensitive resistor 50 to hold the output voltage of the amplifier steady through the operating temperature range. The output voltage of the amplifier is fed to the base of transistor 42 and is sufficient normally to energize the brake coil 41 and actuate the brake 40 to hold the counter 8 locked in a reading position. When the sensor 27 reaches a position to ground the base of transistor 42, the brake 40 releases the counter 8 causing the counter to be snapped by one increment to bring its reading at that instant in accord with the pointer. A diode 51 protects the amplifier 43 from damage due to voltage transients and a diode 52 damps the inductive spike due to field collapse of the coil 41 to protect the transistor 42.

During high speed servo operation, as during rapid ascent or descent, the voltage fed to the amplifier from the generator G is high causing then the output of the amplifier to fall to zero, the actual speed of the servomechanism at which this change in output voltage of the amplifier takes place being determined by the setting of the variable resistor 49. Regenerative feedback through resistors 53 and 54 and via return lead 55 provides the amplifier 43 with a positive switching action. The reduction of the amplifier output voltage to zero during high speed servo operation causes the brake to be then held released continuously with the result that the counter 8 is then moved continuously and coincident with the pointer. However, when the change in ascent or descent falls to a normal rate the output voltage from the amplifier 43 is again restored to actuate the brake and hold the counter locked in a reading position while the altitude is going through a succeeding incremental change registered by the pointer 6.

The embodiment of our invention herein particularly shown and described is intended to be illustrative and not limitative of our invention since the same is subject to changes and modifications without departure from the scope of our invention, which we endeavor to express according to the following claims.

We claim:

1. An indicating system for measuring a variable quantity comprising an instrument having a pointer and a dial graduated to measure successive increments in the range of said quantity, a counter mechanism for measuring said quantity in steps of said increment, a servo motor responsive to changes in said quantity for driving said pointer through successive revolutions according to variations in said quantity, a coupling between said servo motor and counter mechanism for driving said counter mechanism in steps of one increment for each movement of said pointer by one increment, said coupling mechanism including a yieldable memory device permitting said counter mechanism to be braked during a continuing movement of said servo motor and adapted to shift said counter mechanism into a coincidence with said motor when the counter mechanism is released, means for braking said counter mechanism, and control means for said braking means adapted to release said braking means momentarily after each movement of said pointer by one increment whereby to cause said yieldable memory device to step said counter mechanism by one increment each time the pointer has completed one increment of movement.

2. The indicator system set forth in claim 1 wherein said yieldable memory device is biased to a center position to allow said servo motor to advance or recede while said brake is operative, and wherein said control means is operative during both the advance and receding of said servo motor to release said brake momentarily each time said pointer is advanced or returned by one increment on said scale to step said counter ahead or backward by one increment.

3. The indicating system set forth in claim 2 including a voltage supply for normally holding said brake energized, and means operative during a rapid change in said quantity beyond a predetermined speed for reducing said voltage supply approximately to zero whereby to cause said brake to be released and said counter to be moved continuously by said motor during said rapid change.

4. The indicator system set forth in claim 3 including an adjusting means for setting the speed of change in said quantity at which said brake is disabled.

5. The indicator system set forth in claim 1 wherein said dial is circular and is calibrated to cause said pointer to read one increment responsive to each full revolution of the pointer.

6. The indicator system set forth in claim 1 wherein said yieldable memory device includes a rotatable drive member, a rotatably mounted driven member coaxial with said drive member and spaced axially therefrom, a pair of collars between said drive and driven members positioned end-to-end and each having diametrically extending wing portions adjacent the respective drive and driven members, a torsion spring surrounding said collars and hooked at the ends to the winged portions of said respective collars for biasing the collars in opposite directions relative to each other, and pins staked to said drive and driven members respectively, each of said pins extending past said collars from one of said members to the other and being interposed between the winged portions of said collars with the pins being diametrically opposite each other whereby to cause said drive and driven members to assume a fixed rotational relationship to each other while allowing the drive member to be turned in either direction against the tension of said torsion spring relative to the driven member.

7. The indicating instrument set forth in claim 6 including means for braking said driven member, and a sensor timed with the rotation of said pointer for releasing said braking means each time said pointer reaches zero on said dial.

References Cited

UNITED STATES PATENTS 3,154,948   11/1964   Andresen, Jr., et al.   73—386

DONALD O. WOODIEL, Primary Examiner

U.S. Cl. X.R.

73—386